Sept. 24, 1957 H. R. BENNETT 2,807,126
CUTTER MEMBER FOR ROTATING SICKLE TYPE MOWERS
Filed July 14, 1955 2 Sheets-Sheet 1

INVENTOR.
HAROLD R. BENNETT

BY
*Forrest P. Wilson*

ATTORNEY

Sept. 24, 1957 H. R. BENNETT 2,807,126
CUTTER MEMBER FOR ROTATING SICKLE TYPE MOWERS
Filed July 14, 1955 2 Sheets-Sheet 2

INVENTOR.
HAROLD R. BENNETT
BY
*Forrest A. Filson*
ATTORNEY

United States Patent Office 2,807,126
Patented Sept. 24, 1957

2,807,126

CUTTER MEMBER FOR ROTATING SICKLE TYPE MOWERS

Harold R. Bennett, Newton, Kans., assignor to Root Manufacturing Company, Inc., Baxter Springs, Kans., a corporation of Kansas Application July 14, 1955, Serial No. 522,145

7 Claims. (Cl. 56—25.4)

This invention relates to improvements in power mowers of the rotary sickle type.

An object of the invention is to provide such a mower that will not only cut grass, weeds and the like, but will also carry the cuttings away from the cutting surface and discharge them into a container.

A further object is to provide such a mower that exposes the material to be cut to the cutting surface only once and then carries the cut material away from the cutting surface to discharge, thereby reducing the power required for the mowing operation.

A further object of the invention is to provide such a mower that is self cleaning and will not plug or clog as do presently known mowers.

A further object is to provide such a mower that will cut the grass, elevate it to a point above the cutting surface, carry it on the cutter blade to a discharge port, and then discharge the grass into a suitable container.

A further object is to provide such a mower that will prevent cuttings from falling back to the ground so as to provide a clean mowing operation, yet will not pick up dust, sticks, stones, and other foreign material.

A further object of the invention is to provide a cutter bar for mowers that will cut grass and other material, elevate the grass above the cutting surface of the cutter bar, carry the cut grass on the cutter bar to a discharge point, and then discharge the grass into a suitable container.

A further object is to provide such a cutter bar that is adapted for use on presently known rotating sickle mowers.

Other objects and advantages of the invention will become apparent upon examining the accompanying disclosure and drawings.

Although the invention herein disclosed is applicable to mowers of both field and lawn type and to mowers in which the ground wheels are self propelled, this disclosure, for the sake of simplicity, describes only a lawn type mower wherein the cutter bar is power propelled.

Figure 1:
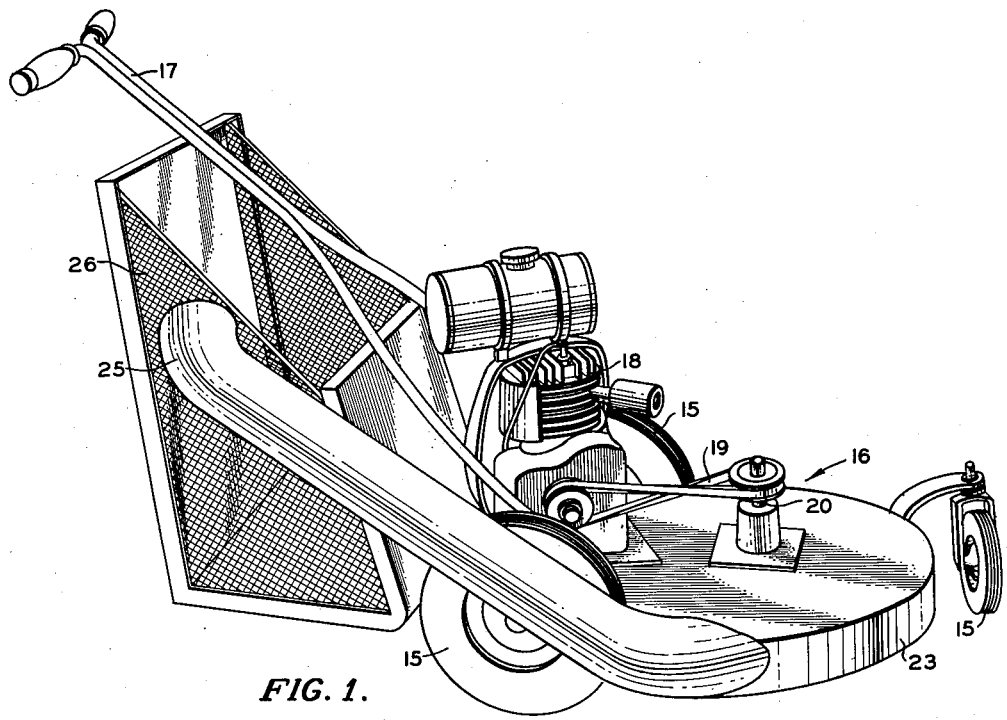
Figure 1 is a side view of a lawn mower incorporating one modification of the invention.
Figure 2:
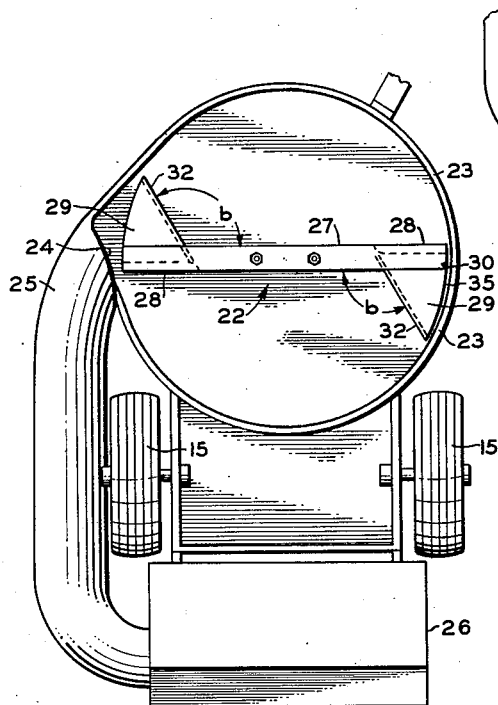
Figure 2 is a bottom view of the mower of Figure 1.
Figure 3:
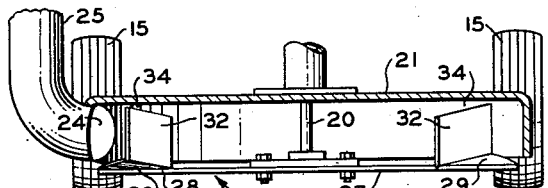
Figure 3 is a side view cut away of the mower of Figure 1.

Referring now to the drawings, the ground wheels 15 are mounted on housing 16 from which extends handle 17 for propelling and guiding the mower over the ground. The engine 18 is secured to housing 16 and is connected by a suitable drive mechanism 19 to one end of shaft 20. Shaft 20 is rotatably mounted in the top 21 of housing 16 such that one end of the shaft is connected to engine 18 as above described and the other end of the shaft extends into housing 16 and is adapted to receive cutter bar 22. Housing 16 is comprised of a top 21 from which substantially cylindrical sides 23 extend downwardly to form the housing within which cutter bar 22 rotates. A port 24 is provided in side 23 for discharge of cuttings from cutter bar 22. Conduit 25 is mounted on port 24 for guiding cuttings discharged through port 24 into container 26.

Cutter bar 22 is mounted at its center on shaft 20 and comprises an arm 27, each end of which has been provided with a cutting surface or knife 28 at the leading edge thereof. A web-shaped riser 29 is provided on each end of arm 27 at the trailing edge thereof, the outer edge 30 of each riser being formed in an arc of substantially the same radius as the radius of arm 27, and the inner or trailing edge 31 of each riser terminating in an impeller 32. The angle "$a$" that riser 29 and impeller 32 make with the horizontal is such that grass cut by knife 28 will be carried up riser 29 and into housing 16 as cutter bar 22 rotates, but will not thereby create or cause updrafts of air beneath knife 28.

The obtuse angle "$b$" that impeller 32 makes with the trailing edge of arm 27 can vary, depending upon the speed with which the cutter bar rotates, it being desirable in each case to provide a sufficient angle so that cuttings passing over knife 28 and up riser 29 and into contact with impeller 32 will be deflected outward toward the end of arm 27 and will not stick to the impeller. It may be desirable to provide the leading edge 33 of impeller 32 with a knife edge to prevent grass from collecting and building up on that portion of the cutter bar. Impeller 32 is preferably mounted upright on arm 27 and at right angles to the arm, although a slight forward angle toward the direction of rotation so as to form a trough between impeller 32 and riser 29 can be used.

The tolerance or spacing 34 between the top of impeller 32 and the top 21 of housing 16 is controlled so that as cutter bar 22 rotates, accumulation of clippings between the housing and cutter bar will be prevented and the mower will be self cleaning due to the scouring action of the impeller. This close spacing also reduces the passage of air over the top of impeller 32 and thus reduces the tendency for clippings to be carried over and into the path of the next cutting surface. This arrangement materially reduces the power required to operate the mower since the grass is exposed to the cutting surface only once and then is carried to discharge on the cutter blade rather than being suspended by air currents within the housing and cut and struck again and again as is the case in present mowers. The tolerance or spacing 35 between the end of impeller 32 and the sides 23 of housing 16 is controlled so that as cutter bar 22 rotates, accumulation of clippings between the sides of the housing and the cutter bar will be prevented to provide a self-cleaning action for the mower. It is preferable to provide a spacing of between one-half and one-eighth inch between the top of the housing and the impeller and between the sides of the housing and the impeller, although other spacings can be used with some success.

In the operation and use of this modification of my invention, as cutter bar 22 rotates, the grass and weeds are cut by knives 28 and the cuttings are elevated on risers 29 into housing 16. The knives can be positioned below the sides of the housing so long as the risers are sufficiently long to terminate above the lower edge of the sides so that the clippings will be elevated up to and inside the housing. The clippings so elevated on risers 29 also move outward on the risers due to the centrifugal force occasioned by the rotation of cutter bar 22. As the clippings move upward and outward on risers 29 they contact impellers 32 and are deflected outward toward the sides 23 of housing 16. The clippings are carried around the housing on the cutter bar until they reach port 24 at which point they are discharged through the port into conduit 25 and thence into container 26. The arrangement of the elements of the mower as above described provides for circulation of air through the mower so that air enters the mower around housing 16 by passing across and beneath sides 23 and risers 29 and up into housing 16 over the relatively large area of the lower side of the housing inside knives 28, then is discharged by the action of impellers 32 through port 24 and conduit 25.

Figures 6, 10:
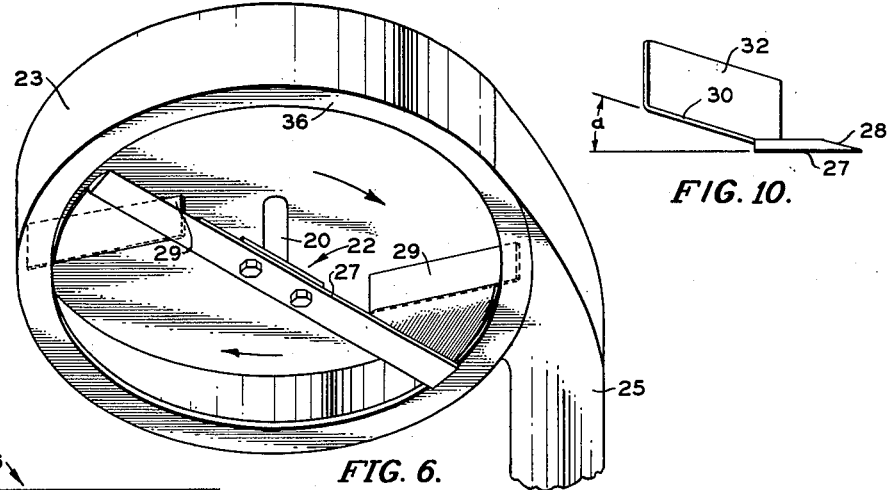
Figure 6 is an enlarged plan view of the bottom of the housing of another modification of the invention.
Figure 10 is an end view of the cutter bar of Figure 5.
Figure 7:
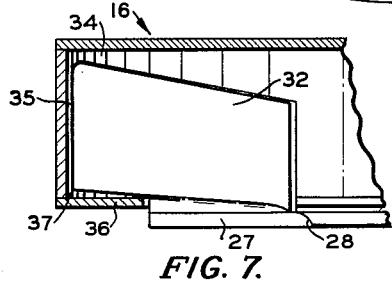
Figure 7 is an enlarged cut away view of the housing of the mower of Figure 6.
Figure 8:
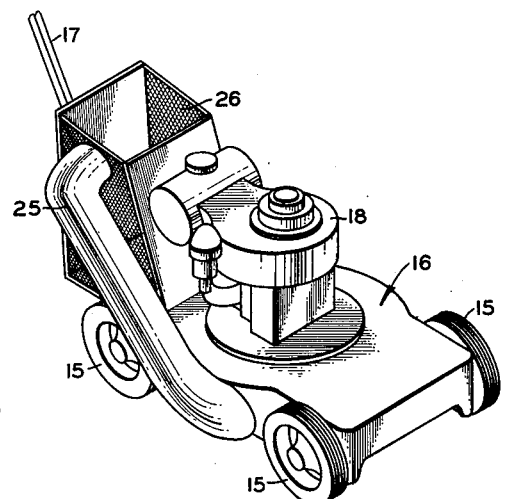
Figure 8 is a reduced side view of a mower incorporating the modification of Figures 6 and 7.
Figure 9:
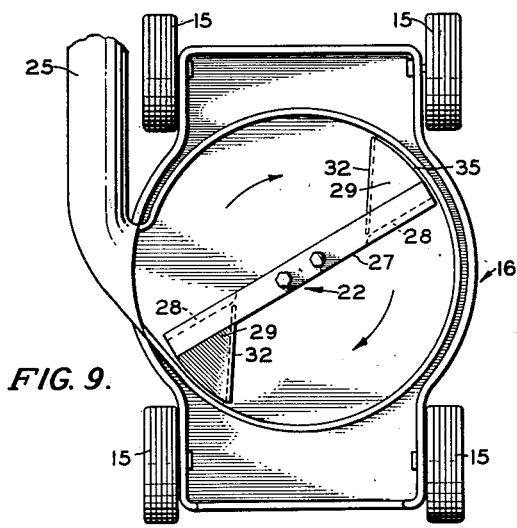
Figure 9 is a reduced bottom view of the mower of Figure 6.

Another modification of my invention is depicted in Figures 6, 7 and 8 wherein sides 23 are provided with a horizontal inwardly extending lip 36 to form a channel 37 within housing 16 in which impeller 32 operates. The outer edge of riser 29 has an arc substantially the same as the arc of arm 27. In this modification, the grass is cut by knife 28 and is carried up riser 29 into housing 16. As the blade rotates, the grass is forced outward by the centrifugal force of rotation plus the deflection action of impeller 32 into channel 37 of housing 16. The clippings are carried around the housing in channel 37 on the cutter bar 22 to the discharge port as before and then are discharged from the mower into a suitable container.

Figure 4:
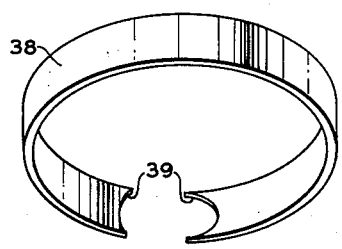
Figure 4 is a view of a ring attachment to be used in one modification of the invention.
Figure 5:
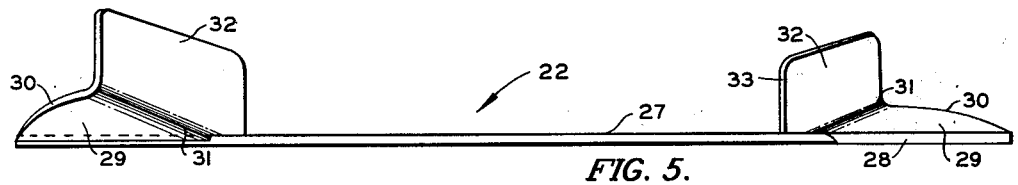
Figure 5 is an enlarged side view of one modification of the cutter bar of the invention.

Still another modification of my invention is shown in Figure 4 wherein the cutter bar 22 of Figure 5 has been adapted for use on presently existing mowers by the use of ring 38 in conjunction with cutter bar 22. In this modification, the use of cutter bar 22 in conjunction with cylindrical ring 38 can be applied to any rotary mower presently known so as to gain the results of my invention. In such application, ring 38, having a discharge port 39, is secured to the underside of the housing with its center at the center of the mower drive shaft. The cutter bar 22 is then mounted on the shaft so that impeller 32 and riser 29 operate at close tolerance with ring 38. The cuttings discharged from the mower can then be collected by a suitable conduit as before and carried to a container for collection.

Other modifications will be apparent to those skilled in the art upon consideration of the foregoing specification and drawings, and therefore it is not desired to limit the invention to the specific modifications shown, but to include all modifications which are within the scope and spirit of the invention as defined by the following claims.

What is claimed is:

1. A rotary sickle mower comprising: a cylindrical housing providing a top wall and circular side wall; a cutter bar rotatably mounted in said housing comprising a substantially straight arm having a knife on each end at the leading edge thereof; a web shaped riser on each end of said arm at the trailing edge thereof inclined upwardly so as to lift cuttings from said knife up into said housing, the radially outer edge of the riser formed in an arc of substantially the same radius as said cutter bar and the inner trailing edge of said riser extending at an obtuse angle to the trailing edge of said arm; an impeller mounted on the trailing edge of said riser and upstanding thereon at an angle to the arm such as to deflect and carry cuttings lifted from said knife on said riser toward the end of said arm and said housing side wall; a discharge port in said housing side wall for receiving cuttings discharged from the cutter bar; a conduit attached to said port at the outside of said housing for transporting clippings from said port; and a container at the other end of said conduit for receiving and storing clippings.

2. A mower according to claim 1 wherein the tolerance between the impeller and the top wall of the housing and between the impeller and the side wall of the housing is between one-eighth and one-half inch.

3. A rotary sickle mower comprising: a housing having a top wall and a cylindrical side wall extending downward from the top wall, a horizontal lip extending inward from the bottom of said side wall so as to form a trough in said housing; a cutter bar rotatably mounted inside said housing comprising an arm, a knife on each end of the arm at the leading edge thereof, a riser at each end of said arm at the trailing edge of the arm and behind said knife, the riser being inclined upward from said arm so as to lift cuttings from said knife into said trough in said housing and the outer edge of the riser forming an arc of substantially the same radius as said arm, an impeller mounted on the trailing edge of said riser at an angle to said arm so as to deflect and carry cuttings from said riser outwardly of the arm into said trough, the impeller extending beyond the end of said arm so as to operate in said trough as the cutter bar rotates; a port in the side wall of said housing for receiving clippings discharged from said cutter bar; a conduit leading from said port external of the housing for guiding clippings discharged through the port; and a container at the other end of said conduit for receiving and storing clippings.

4. A mower according to claim 3 wherein the clearance between the top of the impeller and the top wall of the housing and between the outer end of the impeller and the side wall of the housing is between one-eighth and one-half inch.

5. A cutter bar comprising: an elongated substantially straight arm adapted for rotation about an axis intermediate of the arm ends; a knife on each end of said arm at the leading edge thereof; a web shaped riser on each end of said arm at the trailing edge thereof behind said knife, said riser being inclined upward from said arm so as to elevate material cut by said knife, the outer edge of said riser forming an arc of substantially the same radius as said arm about its axis of rotation and the trailing edge of said riser extending at an obtuse angle to said arm; an impeller mounted on the trailing edge of said riser and upstanding thereon at an obtuse angle to the arm of said cutter bar such that material delivered by said riser will be carried and deflected by the impeller outwardly toward the end of said arm.

6. An attachment for rotary sickle mowers comprising: a cylindrical ring adapted for attachment to the underside of a rotary sickle mower housing, said ring having a discharge port therein; a cutter bar adapted for rotation in said cylindrical ring, the cutter bar comprising an elongated arm adapted for rotation intermediate of its ends, a knife on each end of said arm at the leading edge thereof, a riser on each end of said arm at the trailing edge thereof, said riser being inclined upward from said arm so as to elevate material cut by said knife, and an impeller mounted on the trailing edge of said riser at an angle to said arm so as to carry and deflect material delivered by said riser to the end of said arm for discharge through the port in said ring.

7. An attachment for rotary sickle mowers comprising: a cylindrical ring adapted for attachment to the underside of a rotary sickle mower housing, said ring having a discharge port therein; a cutter bar adapted for rotation in said cylindrical ring about the axis thereof, said cutter bar comprising a substantially straight elongated arm, a knife on each end thereof at the leading edge, a web shaped riser on each end of said arm at the trailing edge thereof, said riser being inclined upward from said arm so as to elevate material from said knife up to said ring and having its outer edge formed in an arc of substantially the same radius as said arm, and an upright impeller mounted on the trailing edge of each of said risers, the impeller being fixed at an angle to said arm so as to carry and deflect material delivered by said riser to the end of said arm for discharge through the port in said ring.

References Cited in the file of this patent

UNITED STATES PATENTS

| | | |
|---|---|---|
| 1,336,257 | Muzzy | Apr. 6, 1920 |
| 2,663,984 | Clark | Dec. 29, 1953 |
| 2,706,372 | Blydenburgh | Apr. 19, 1955 |
| 2,719,396 | Morris et al. | Oct. 4, 1955 |
| 2,720,070 | Arrington | Oct. 11, 1955 |